(12) United States Patent
Nicholson et al.

(10) Patent No.: US 11,170,160 B2
(45) Date of Patent: Nov. 9, 2021

(54) METHOD AND DEVICE TO AUTOMATE CONTENT TRANSFER BASED ON RESOURCE CONTEXT AWARENESS

(71) Applicant: Lenovo (Singapore) Pte. Ltd., New Tech Park (SG)

(72) Inventors: John Weldon Nicholson, Cary, NC (US); Daryl Cromer, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 332 days.

(21) Appl. No.: 15/961,474

(22) Filed: Apr. 24, 2018

(65) Prior Publication Data

US 2019/0325016 A1 Oct. 24, 2019

(51) Int. Cl.
*G06F 40/174* (2020.01)
*G06F 9/54* (2006.01)
*G06N 20/00* (2019.01)
*G06F 16/2457* (2019.01)

(52) U.S. Cl.
CPC ............ *G06F 40/174* (2020.01); *G06F 9/543* (2013.01); *G06N 20/00* (2019.01); *G06F 16/24578* (2019.01)

(58) Field of Classification Search
CPC .. G06F 9/543; G06F 40/174; G06F 16/24578; G06F 16/972; G06F 40/166; G06N 20/00
USPC ......................................................... 715/770
See application file for complete search history.

(56) References Cited

U.S. PATENT DOCUMENTS

| | | | |
|---|---|---|---|
| 2005/0102629 A1* | 5/2005 | Chen ...................... | G06F 3/0481 715/770 |
| 2015/0026620 A1* | 1/2015 | Kwon .................. | G06F 3/04845 715/770 |
| 2015/0248391 A1* | 9/2015 | Watanabe ........... | G06F 16/9554 715/226 |

\* cited by examiner

*Primary Examiner* — Andrey Belousov
(74) *Attorney, Agent, or Firm* — The Small Patent Law Group LLC; Dean D. Small

(57) ABSTRACT

A method, device and computer program product are provided. The method is under control of one or more processors includes program instructions to perform resource context awareness (RCA) by automatically. The method accesses an active destination resource at a computing device, matches the active destination resource to a resource context of interest (COI) from an RCA transfer library and transfers an outbound resource advancement (RA) content segment stored in memory of the computing device to the active destination resource based on the resource COI from the RCA transfer library.

20 Claims, 3 Drawing Sheets

METHOD AND DEVICE TO AUTOMATE CONTENT TRANSFER BASED ON RESOURCE CONTEXT AWARENESS

BACKGROUND

Embodiments herein generally relate to methods and devices for automatically transferring content between applications and a clipboard based on resource context awareness.

Today, individuals utilize computing devices to implement a wide variety of applications, such as network related applications, locally operated applications and otherwise. For example, a network related application may be accessed through and navigated by a browser operating on a user's computing device. As another example, local applications may include word processing applications, Excel spreadsheets, drafting packages and the like. As another example, a local application may operate in connection with a remote server, such as an application loaded on a smartphone, tablet device, etc., to access a bank account, airline reservation service, online shopping service, restaurant reservation service, restaurant or coffee shop order service and the like.

Many applications require a user to login to an account and to enter certain "standard" types of content into predetermined fields in connection with navigating the application. For example, as part of the login process, a user is often required to enter credentials in connection with two-factor authentication where at least a portion of the credentials are received at the computing device through a separate application (e.g., a text message, email). As another example, when a user utilizes a travel reservation application (e.g., booking an airline flight or hotel), the application will prompt the user for standard content, such as name, age, address, credit card information and the like.

Today, users manually enter the content into the corresponding fields in an application requesting such information. The user may manually type the content in the field. Alternatively, the user may obtain the content from a separate application, such as in connection with two-factor authentication, requesting a new password for an account and the like. Also, in some instances, users may maintain certain repetitive content (e.g., usernames, passwords, credit card numbers, etc.) in a local application (e.g., a word file, Excel spreadsheet, or password manager). When a user opens a new application that requires such authentication or repetitive content, the user either re-types the content into the corresponding field in the destination resource or "copies and pastes" the content from the source Word or Excel file to the destination resource. In connection therewith, the user manually selects and copies portions of text received from an e-mail, a short message service, a uniform resource locator (URL), and/or the like using a user interface. The user is then required to select the appropriate field and/or position and to paste the copied content to the field/position. The foregoing process for transferring content between applications is time-consuming, cumbersome and prone to mistakes.

SUMMARY

In accordance with embodiments herein, a method is provided. The method comprises, under control of one or more processors, included program instructions to perform resource context awareness (RCA) automatically. The method accesses an active destination resource at a computing device, matches the active destination resource to a resource context of interest (COI) from an RCA transfer library and transfers an outbound resource advancement (RA) content segment stored on a memory of the computing device to the active destination resource based on the resource COI from the RCA transfer library.

Optionally, the method may designate a content segment stored in the memory of the computing device to be the outbound RA content segment based on the resource COI. The method may include receiving a user confirmation input in connection with automatically transferring the content segment to the memory. The method may identify a transfer action from the RCA transfer library based on the resource COI. The transfer action may include an operation to transfer a content segment from a source resource. The outbound RA content segment may be identified based on the transfer action. The transfer action may identify source and destination contexts for the source and active destination resources.

Optionally, the RCA transfer library may include multiple transfer actions that may comprise operations for selecting a source field from a source resource, copying content from the source field to the memory, selecting content from the memory, designating a destination field within a destination resource and copying the content from the memory to the destination field within the destination resource. The transferring may be based on one of the transfer actions corresponding to the resource COI. The method may access a source resource at the computing device. The method may automatically identify a transfer action associated with a combination of the source resource and the active destination resource. The transfer action may designate the resource COI associated with a content segment to copy and paste from the source resource and to the active destination resource.

Optionally, the method may identify an incoming content segment within the source resource and may copy the incoming content segment to the memory. The transferring may comprise automatically pasting the incoming content segment to the active destination resource as the outbound RA content segment. The memory may comprise multiple content segments arranged on the memory in an order in which the content segments were stored to the memory. The transferring may comprise automatically pulling the outbound RA content segment from the memory independent of the order in which the content segments are arranged on the memory. The method may populate the RCA transfer library by tracking content segments copied from source resources to the memory, identifying source resources COI from the source resources, tracking destination resources to which the content segments are pasted, identifying destination resources COI for the destination resources, determining a correlation between the content segments, the source resources COI and the destination resources, and building transfer actions based on the correlation and storing the transfer actions in the RCA transfer library.

In accordance with embodiments herein, a device is provided. The device comprises memory to store program instructions. The memory includes a clipboard to store content segments. The device comprises, under control of one or more processors, included program instructions to perform resource context awareness (RCA) by automatically accessing an active destination resource opened on the device, matching the active destination resource to a resource context of interest (COI) from a resource context awareness (RCA) transfer library, and transferring an outbound resource advancement (RA) content segment stored on the clipboard of the computing device to the active destination resource based on the resource COI from the RCA transfer library.

Optionally, the memory may store an application. The device may further comprise a display to display a window associated with the application operating on the device. The window may correspond to the active destination resource. The transferring may comprise pasting the outbound RA content segment to a field in the window. The content segment may represent a credential, and the active destination resource may represent a login webpage. The transferring may comprise automatically pasting the credential to a credential entry field in the webpage. The resource COI may represent one or more of a credentials context, multi-factor authentication context, travel context, account profile context, and financial payment context. A machine learning algorithm (MLA) may be stored on the memory. The MLA may update the RCA transfer library. The RCA transfer library may be stored and maintained on a remote device. The memory may store the RCA transfer library. The device may identify an incoming content segment within a source resource and may copy the incoming content segment to the clipboard based on a transfer action stored in the RCA transfer library. The transferring may comprise automatically pasting the incoming content segment to the active destination resource as the outbound RA content segment.

In accordance with embodiments herein, a computer program product is provided. The computer program product comprises a non-signal computer readable storage medium comprising computer executable code to perform resource context awareness (RCA) by automatically accessing an active destination resource at a computing device, matching the active destination resource to a resource context of interest (COI) from an RCA transfer library and transferring an outbound resource advancement (RA) content segment stored on a clipboard of the computing device to the active destination resource based on the resource COI from the RCA transfer library.

Optionally, the executable code may access a source resource at the computing device and may automatically identify a transfer action associated with a combination of the source resource and the active destination resource. The transfer action may designate the resource COI associated with content to copy and paste from the source resource and to the active destination resource. A clipboard may store multiple content segments arranged on the clipboard in an order in which the content segments were stored to the clipboard. The executable code may automatically pull the outbound RA content segment from the clipboard independent of the order in which the content segments are arranged on the clipboard. The executable code may populate the RCA transfer library by tracking content segments copied from source resources to the clipboard, identifying source resources COI from the source resources, tracking destination resources to which the content segments are pasted, identifying destination resources COI for the destination resources, determining a correlation between the content segments, the source resources COI and the destination resources and building transfer actions based on the correlation and storing the transfer actions in the RCA transfer library.

DETAILED DESCRIPTION

Figure 1:
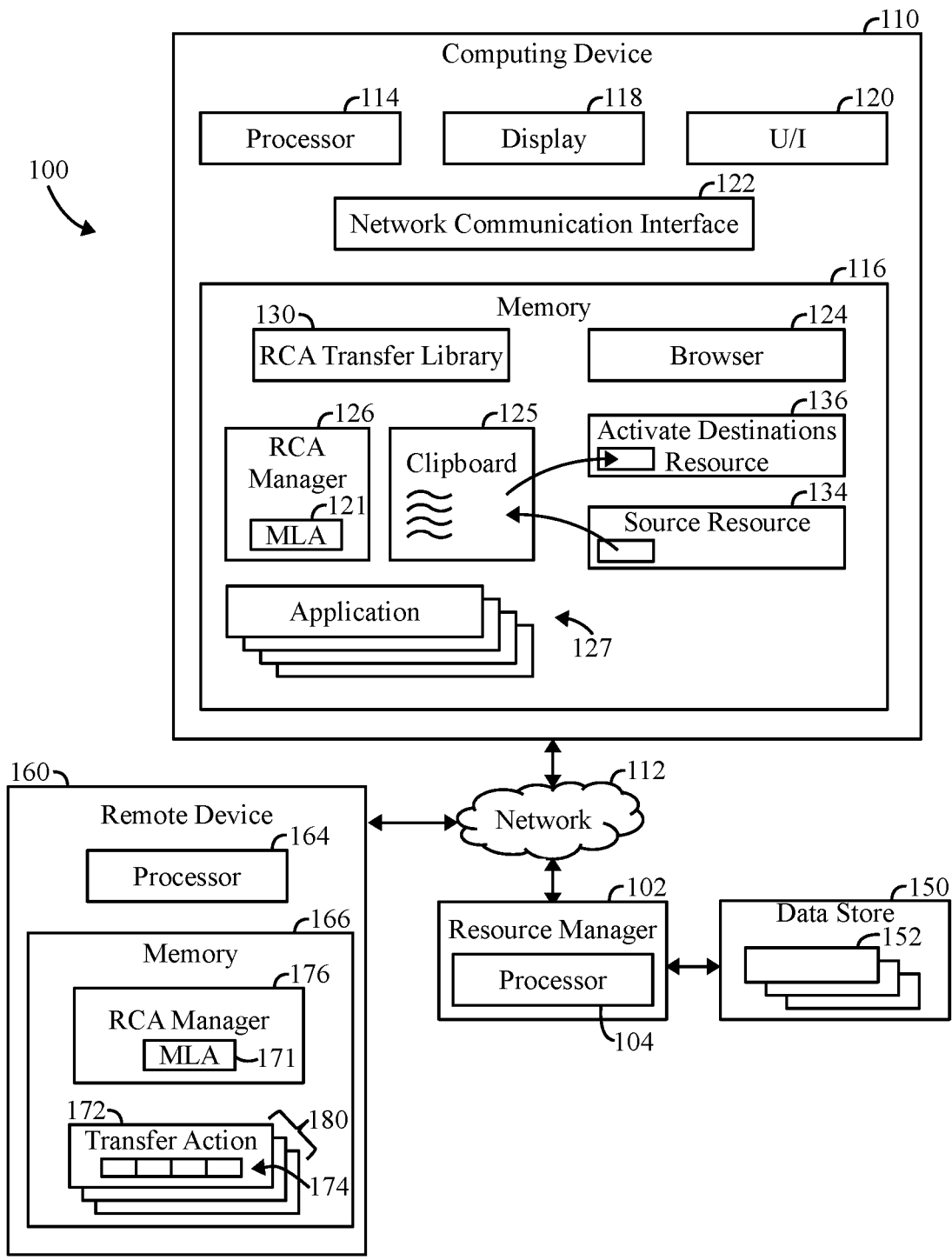
FIG. 1 illustrates a system implemented to automatically transfer content to a resource based on resource context awareness in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, and/or the like. In other instances, well-known structures, materials, or operations are not shown or described in detail to avoid obfuscation. The following description is intended only by way of example and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

The term "destination resource" as used throughout, refers to a resource (e.g., window, webpage, etc.) presented on a display to the user in connection with the operation of an application, where the resource includes one or more content entry fields that the user populates before the application will advance beyond the resource. A destination resource is "active" when the resource is open and displayed on the display of the computing device.

The term "source resource" as used throughout, refers to a resource (e.g., SMS text message, email, webpage, Word file, Excel file, Notes board) presented on a display to the user and containing one or more content segments intended to be copied to a data entry field in a destination resource.

The terms "resource advancement content segment" and "RA content segment" as used throughout, refers to any and all textual, image, audio or video information, script components, URLs, links and/or a combination thereof, that are entered into a destination resource in connection with advancing to a next window, state, function or phase of the application. The RA content may include at least one of e-mail content, short message service (SMS) content (e.g., text message), website content (e.g., text, images, script), a uniform resource locator (URL), a telephone number, personal content information (e.g., address), credentials (e.g., password), multi-factor authentication, travel (e.g., air, car, hotel), account profile information, financial payment numbers, (e.g., credit card, PayPal, debit card), such as the complete data content (including addressing headers) for an individual or string of email messages, text messages and/or the like. The RA content may also include linking components that include a link or address of other RA content. The RA content components may also represent script-based components, for which one or more scripts are to be executed before a browser can render and display an executed script (e.g., graphics, text, images, video, audio and the like). The RA content components may also represent auto activated components that begin to play automatically when opened in a browser.

The term "transfer action" refers to a sequence of one or more operations to be performed in connection with transferring content between two resources. Non-limiting examples of operations within a transfer action include selecting a source field from a source resource, copying content from the source field to a clipboard, selecting content from a clipboard, designating a destination field within a destination resource and copying content from a clipboard to a destination field in a destination resource. A transfer action includes, among other things, information identifying a context of source and/or destination resources between which content is transferred (also referred to as source and destination contexts). A transfer action may also include one or more characteristics of interest for a content segment copied from a source resource, and/or one or more characteristics of interest for a data entry field in a destination resource to which a content segment is copied.

The term "transfer library" is used generally to refer to any type of memory section that is managed to store the types of content described herein. The "transfer library" may store content in various formats at a common discrete location and/or distributed across multiple storage locations, such as multiple servers, cloud resources, and/or the like.

The term "machine learning algorithm" refers to an artificial intelligence algorithm that learns from various automatic or manual inputs, such as observations and/or data. For example, the machine learning algorithm may be configured based on the measuring of historical responsiveness based on text copied from the communication content. The machine learning algorithm is adjusted over multiple iterations based on the observations and/or data. For example, the machine learning algorithm is adjusted by supervised learning, unsupervised learning, and/or reinforcement learning. Non-limiting examples of machine learning algorithms are a decision tree, K-means, deep learning, artificial neural network, and/or the like.

FIG. 1 illustrates a system implemented in accordance with embodiments herein to automatically transfer content to a resource based on resource context awareness. The system utilizes a machine learning algorithm or artificial intelligence engine to monitor for "likely to copy" content segments, for which a high probability exists that a user will copy the contents segment from a source resource onto a clipboard. The system utilizes the machine learning algorithm or artificial intelligence engine to determine "likely to paste" content segments, for which a high probability exists that a user will paste the contents segment from the clipboard to a field in a destination resource. The system further provides a clipboard management function that allows multiple content segments (objects) to be maintained on the clipboard at the same time and to be pulled from the clipboard in any order without regard for an order in which the content elements were added/stacked onto the clipboard.

The system 100 includes one or more resource managers 102 that manage and otherwise provide access to one or more data stores 150 that store network resources 152. The resource managers 102 communicate with one or more computing devices 110 through one or more networks 112, to provide access to the applications (network resources 152). The networks 112 may represent the World Wide Web, a local area network, a wide area network, and/or the like. The computing devices 110 may represent various types of electronic devices (e.g., digital personal assistant, virtual assistant, intelligent digital assistant, client device, and/or the like) including, but not limited to, a smartphone, a cell phone, a laptop, a computer, a tablet device, and/or the like. Optionally, the system 100 includes one or more remote devices 160 that build and maintain a resource context awareness (RCA) transfer library. Optionally, the computing devices 110 may build and maintain the RCA transfer library instead of or in addition to the RCA transfer library maintained by the remote device 160.

The resource manager 102 may represent a server or other network-based computing environment. The resource manager 102 may represent a single computer system or a collection of computer systems located at a common location or geographically distributed. The resource manager 102 includes one or more processors 104 and memory 116, among other structures that support the operation of the resource manager 102. Optionally, the resource manager 102 may be included on the computing device 110. The data store 150 may store the network resources 152 organized in various manners and related to a wide variety of topics and content. As non-limiting examples, collections of network resources 152 may be organized and maintained in connection with websites, web pages, blogs, social media, and/or the like.

The computing device 110 includes one or more processors 114, memory 116, a display 118, a user interface 120 and a network communications interface 122. The display 118 and user interface 120 collect information from and present information to the user in connection with various operations and applications implemented by the computing device 110. The network communications interface 122 facilitates communication through the network 112 with the resource manager 102.

The memory 116 stores various data, programs, applications and the like. In connection with embodiments herein, the memory 116 stores a resource context awareness (RCA) manager 126 that implements operations as described herein. The memory 116 further stores a machine learning algorithm (MLA) 121 implemented by the RCA manager 126 to perform operations as described herein. The memory 116 further stores an RCA transfer library 130 that maintains transfer actions as described herein to support content transfer in connection with resource context awareness. Optionally, the computing device 110 may utilize a browser 124 that is operated in connection with one or more applications 127 to navigate between source and destination resources 134, 136.

As explained herein, the RCA manager 126 monitors and identifies access to an active destination resource 136 at the computing device 110. The RCA manager 126 identifies a resource context associated with the active destination resource 136 and matches the active destination resource 136 to a resource context of interest in the RCA transfer library 130. The RCA manager 126 utilizes the match to the resource context of interest to identify a transfer action from the RCA transfer library 130 that is potentially related to the active destination resource 136. From the transfer action, the RCA manager 126 identifies one or more content segments of interest stored on the clipboard 125 in the memory 116. The RCA manager 126 designates the identified content segment as an outbound resource advancement (RA) content segment. The RCA manager 126 transfers the outbound RA content segment from the clipboard 125 to a corresponding field in the active destination resource 136, thereby affording a content transfer operation based on resource context awareness.

The application 127 may represent various types of applications, such as network related applications that interact with a remote network resource. When the application 127 represents a network related application, the browser 124 may be utilized to initiate a browser session at the computing device 110. The browser 124 since various request to the network resource (e.g., resource manager 102) and in response thereto, receives network resources, one or more of which may represent an active destination resource. The RCA manager 126 monitors operation of the browser 126 to determine when a network resource is accessed that calls for entry of content before the application may progress past the network resource. For example, the RCA manager 126 may determine whether the network resource includes a content entry field that must be populated in order to advance operation of the application to a next window, function, or phase. For example, the window may present a login page, travel site check-in webpage, and/or a payment page where credit card information is entered. As another example, the active destination resource may present a window requesting profile information, such as in connection with buying plane tickets, renting a car, or reserving a hotel room. For example, a destination resource may be activated/opened from a webpage by selecting a link, opening a Facebook application, logging into an airline, hotel, bank, rental car application or website. For example, the active destination resource may represent a login window, where a user ID and password fields require entry of user credentials as RA content before the application will advance past the login screen. As another example, the active destination resource may represent a credit card information entry window, where credit card related information is required as the RA content before the application will advance to the next page/resource.

When the RCA manager 126 identifies a network resource that has one or more content entry fields, the RCA manager 126 declares the network resource to represent an active destination resource. In accordance with embodiments herein, the RCA manager 126 implements operations described herein to determine whether the clipboard includes a content segment appropriate to automatically paste, as an outbound RA content segment, to a field in the active destination resource.

The RCA manager 126 may execute one or more machine learning algorithms (MLA) 121 stored in the memory 116 to build and update the RCA transfer library 130. The processors 114 may execute a decision tree, K-means, deep learning, artificial neural network, and/or the like. To build and update the RCA transfer library 130, the MLA 121 monitors operations performed by the computing device 110 periodically, over an extended period of time, during a learning mode or otherwise. The RCA manager 126, utilizing the MLA 121, monitors and tracks user actions in connection with an opening, accessing and closing resources (e.g., web pages, application windows) during operation of the computing device 110. The RCA manager 126 monitors and tracks the user interactions in search of action sequences representing all or part of "transfer actions." When the RCA manager 126 identifies a transfer action, the RCA manager 126 performs operations described herein to build or update the RCA transfer library 130.

The remote device 160 may represent a server or other network-based computing environment. The remote device 160 may represent a single computer system or a collection of computer systems located at a common location or geographically distributed. The remote device 160 includes one or more processors 164, memory 166, a display, a user interface and a network communications interface. The display and user interface collects information from and present information to the user in connection with various operations and applications implemented by the remote device 160. The network communications interface facilitates communication through the network 112 with the resource manager 102 and numerous computing devices 110.

The memory 166 stores various data, programs, applications and the like. In connection with embodiments herein, the memory 166 stores a resource context awareness (RCA) manager 176 that implements operations as described herein. The memory 166 further stores a machine learning algorithm (MLA) 171 implemented by the RCA manager 176 to perform operations as described herein. The memory 166 further stores an RCA transfer library 180 that maintains transfer actions 172 as described herein to support content transfer in connection with resource context awareness. By way of example, a transfer action 172 may include a record of a series of operations 174 performed in connection with a combination of a source resource and destination resource. The transfer action 172 may include and define one or more of the context of the source and destination resources, one or more characteristics of interest for the content segment copied from the source resource, one or more characteristics of the field within the destination resource to which the content segment is pasted, as well as additional or alternative information.

The remote device 160 collects information concerning copy and paste operations performed by a large population of computing devices 110 and analyzes the copy and paste operations to identify transfer actions performed by the computing devices 110. In accordance with an embodiment, the computing devices 110 may maintain records of contexts for source and destination resources accessed by the computing devices 110, characteristics of interest for content segments copied from source resources and pasted to destination resources, and characteristics of interest for data entry fields in the destination resources that receive the content segments. The computing devices 110 convey, to the remote device 160, the contexts for the source and destination resources and characteristics of interest for content segments and data entry fields. The remote device 160 calculates transfer actions based on the records of the source and destination resources and content segments. Optionally, the computing devices 110 may perform all or a portion of the operations to calculate the transfer actions.

Figure 4:
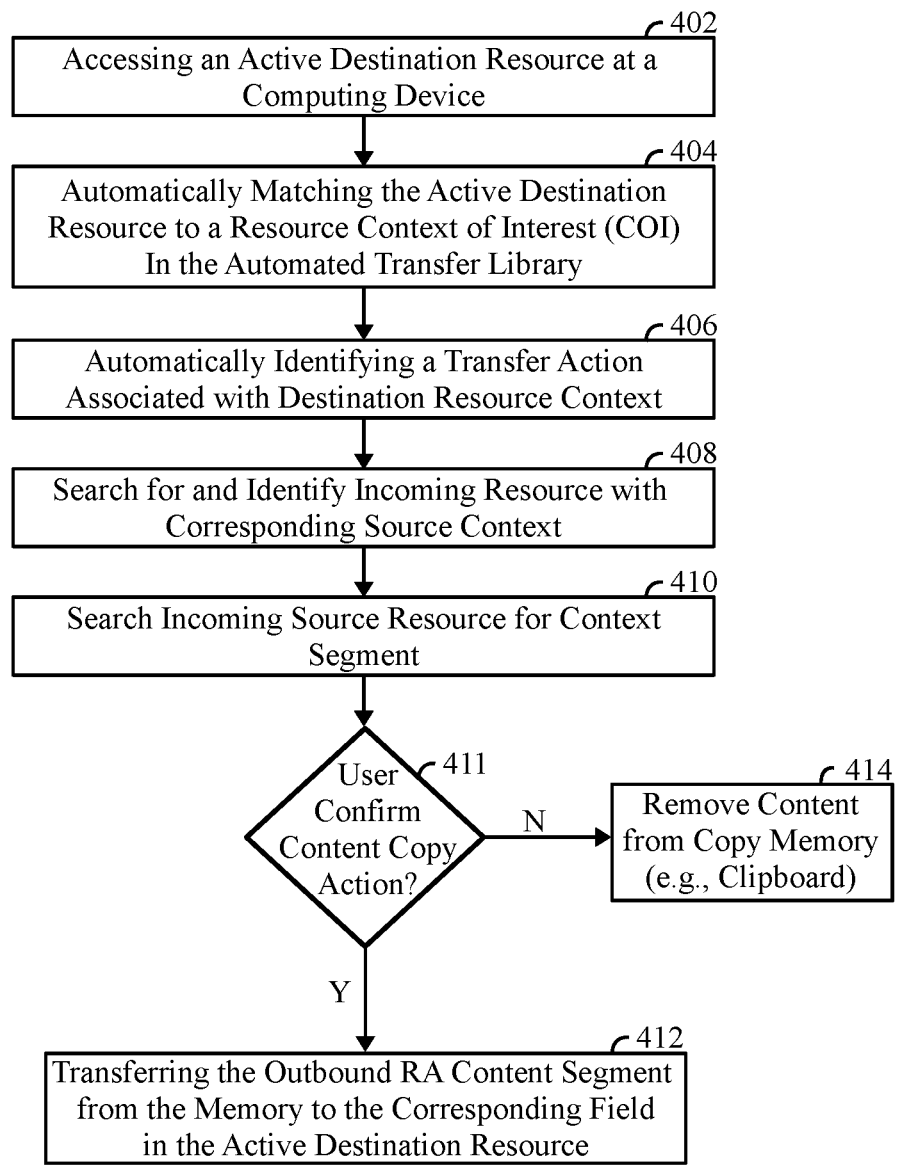
FIG. 4 illustrates a process for the automatically transferring content segments from a source resource to a destination resource in accordance with an alternative embodiment.

As explained herein, the RCA manager 176 builds and updates transfer actions 172 within the RCA transfer library 180, such as based on the operations described herein in connection with FIG. 4. The RCA manager 176 processes the records, from computing devices 110, that track content segments copied from source resources to a clipboard, identify source resource contexts of interest from the source resources, track destination resources to which the content segments are pasted, identify destination resource contexts of interest for the destination resources, determine a correlation between the content segments, the source resources COI and the destination resources, and build transfer actions based on the correlation and storing the transfer actions in the RCA transfer library.

The RCA manager 176 may execute one or more machine learning algorithms (MLA) 171 stored in the memory 166 to build and update the RCA transfer library 180. The processors 164 may execute a decision tree, K-means, deep learning, artificial neural network, and/or the like. To build and update the RCA transfer library 180, the MLA 171 monitors operations performed by the computing device 110 periodically, over an extended period of time, during a learning mode or otherwise. The RCA manager 126, utilizing the MLA 121, monitors and track user actions in connection with the opening, accessing and closing resources (e.g., web pages, application windows) during operation of the computing device 110. The RCA manager 126 monitors and tracks the user interactions in search of action sequences representing all or part of "transfer actions". When the RCA manager 126 identifies a transfer action, the RCA manager 126 performs operations described herein to build or update a transfer action 172 in the RCA transfer library 180.

Figure 2:
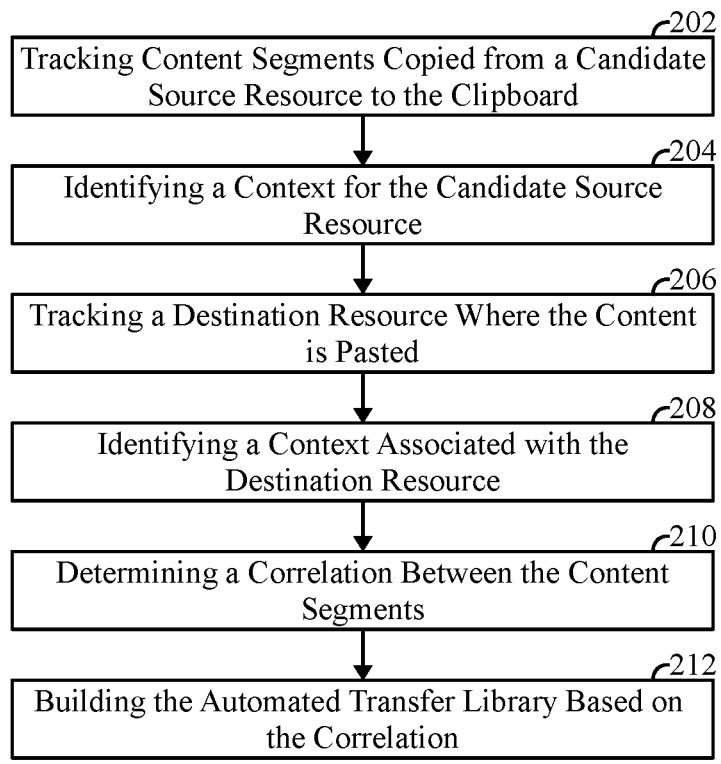
FIG. 2 illustrates a process for building the RCA transfer library in accordance with embodiments herein.

FIG. 2 illustrates a process for building the RCA transfer library in accordance with embodiments herein. For example, the operations of FIG. 2 may be implemented all or in part by the computing device 110, and/or remote device 160. As a further example, the operations of FIG. 2 may be implemented by the processors 114, 164 in connection with implementing the RCA manager 126, 176 and/or MLA 121, 171.

At 202, one or more processors of the computing and/or remote devices 110, 160, identify when a resource is open and track content segments copied from the resource to a clipboard on the computing device. For example, when all or select types of content are copied to a clipboard, the processors 114, 164 may determine the source of the content. Responsive to the content is copied from a resource (e.g., webpage, application window, etc.) the processors designate the copying operation as a portion of a candidate transfer action and designate the resource as a candidate source resource. A source is designated as a "candidate" source resource unless and until the content copied therefrom is pasted to a destination resource. When the content is copied to a destination resource, the candidate source resource is no longer a "candidate," but instead is relabeled as a source resource. When content is copied from a resource but not pasted anywhere, the resource does not represent a "source" resource in accordance with the operations described herein.

At 204, the one or more processors identify a context associated with the candidate source resource. For example, the processors may identify the source context to represent a text message or email message (e.g., when two-factor authentication is utilized). As another example, the processors may identify the source context to represent a Word document or Excel spreadsheet.

At 206, the one or more processors track a destination resource to which the content (from the candidate source resource) is pasted. For example, the processors track operations in which the content is selected from the clipboard and pasted to a field in a resource. The resource receiving the content is designated as a destination resource.

At 208, the one or more processors identify a context associated with the destination resource. For example, the processors may identify the context to represent a credentials context, such as for a bank account login page, a travel agency login page, a login page for an application associated with an airline or hotel and the like. As other examples, the context may represent personal information context (e.g., a data entry page for entering personal information) or a credit card information context (e.g., a payment page for entering credit card information).

At 210, the one or more processors determining a correlation between the source resource, destination resource and content copied and pasted therebetween, and save the sequence of operations and correlation as a transfer action. For example, the correlation performed by the processors may represent a Jaccard index (e.g., statistic comparing the similarity, diversity of the first and second resource COIs), Term Frequency-Inverse Document Frequency (e.g., a weighting method for calculating similarity), and/or the like. Additionally or alternatively, the one or more processors may identify a characteristic of interest from the content segment copied from the source resource and/or a characteristic of interest from the data entry field in the destination resource. For example, the content segment may represent alphanumeric text, a hyperlink, a script and the like, while the data entry field in the destination resource may have field characteristics to receive alphanumeric text, a hyperlink, a script and the like. The processors may record in connection with the transfer action, the characteristics of interest identifying the nature or type of content segment and/or data entry field.

At 212, the one or more processors build and/or update the RCA transfer library 130, 180 based on the correlation determined. For example, the processors may record in the RCA transfer library transfer actions that indicate context associated with source resources in combination with context associated with destination resources, as well as indicators of one or more characteristics of interest of the content transfer therebetween historically. As a further example, a transfer action may indicate that, when a user opens an active destination resource corresponding to a bank login page and substantially contemporaneously therewith receives a text message having an alphanumeric code, the alphanumeric code is to be copied onto the clipboard and pasted from the clipboard to the bank login page. As another example, a transfer action may indicate that, when a user opens a bank login page and substantially contemporaneously opens a pre-existing spreadsheet (that has been accessed multiple times in the past), alphanumeric codes from specific cells in the spreadsheet is to be copied to the user ID field and the password field in the bank login page. Similarly, a separate transfer action may indicate that when the user opens a different login page, and the same pre-existing spreadsheet, alphanumeric codes from different specific cells in the spreadsheet should be copied to the user ID and password fields for the login page.

The foregoing example illustrates a process in which the processors may correlate resources by tracking a path of individual content segments. However, content segments may not be copied from one resource and pasted to another resource in a relatively short or contemporaneous period of time. For example, a user may open a spreadsheet having multiple passwords and copy the passwords to a clipboard. An extended period of time may pass before the user chooses and paste one or more of the passwords to a subsequently opened login page. Optionally, the processors may perform correlation based on the types of resources from which content is copied and to which content is pasted. For example, the processors may build the RCA transfer library to include ranks indicative of a probability that a new content segment is to be copied to an active destination resource. The processors may adjust the RCA transfer library within the memory to rank the content segments based on the ranks indicative of a probability that a new content segment is to be copied to the active destination resource. The processors may rank the content segments based on the correlation. For example, responsive to the similarities between the resource contexts, the processors may rank the resources similarly. Additionally or alternatively, responsive to differences and/or lack of correlation between the first resource contexts, the processors may rank the resources separate from another, such as at different ranks. Additionally or alternatively, rankings may be generated based in part on a time delay between when the source and destination resources are opened.

In connection with the foregoing operations, the automatic transfer library is built while the RCA manager monitors operations by the user. For example, the RCA manager identifies that a user opens a first resource that corresponds to a login page, and subsequently receives a notification from a second resource (e.g., an email message or text message). The RCA manager identifies that the user selects and copies content from a field in the second resource (e.g., a temporary password in an email message, a numeric code in a text message). The RCA manager identifies that the user selects/designates a field in the first resource (e.g., clicking a cursor on a user ID field or password field in the login page). The RCA manager identifies that the user performs one or more clipboard paste operations to paste content to the designated field, and then choose a submit/enter icon on the first resource. The RCA manager and MLA monitor and track the foregoing operations and record the foregoing operations as a transfer action in association with source and destination resources having corresponding resource contexts of interests (COIs).

For example, each time content is copied to the clipboard, the RCA manager may identify a resource COI that is copied onto a clipboard. The COI may represent communication content that is copied from the clipboard, into one or more fields, and/or the like. The RCA manager identifies a field of the active destination resource that is being copied from the clipboard.

FIG. 2 is described in connection with observing transfer actions in connection with a clipboard. It is recognized however that the clipboard may be omitted in connection with embodiments herein. Instead, embodiments may be implemented that do not utilize a clipboard, but instead utilize some other form of the memory.

Figure 3:
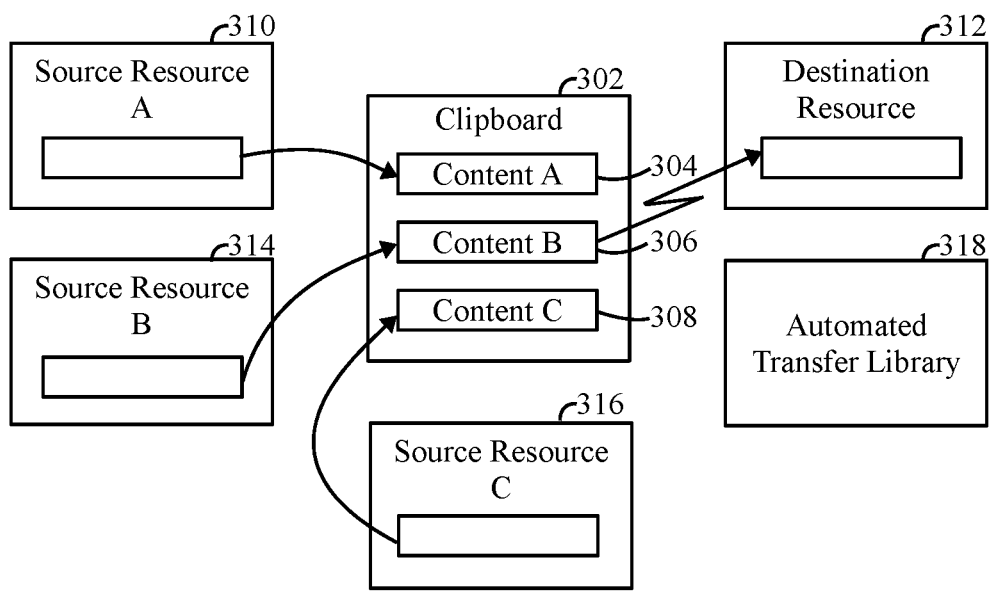
FIG. 3 illustrates a graphical representation of a process for automatically managing content transfer to a destination resource based on resource context awareness in accordance with embodiments herein.

FIG. 3 illustrates a graphical representation of a process for automatically managing the content transfer to a destination resource based on resource context awareness. FIG. 3 illustrates a clipboard 302, such as stored in the memory of the computing device (e.g., computing device 110), resources 310, 314 and 316, a destination resource 312 and an RCA transfer library 318. The source resources 310, 314 and 316 may be accessed in connection with the implementation of a single application, such as different web pages presented while accessing a user account, scheduling travel, etc. Alternatively, the source resources 310, 314 and 316 may correspond to separate and independent applications (e.g., an Excel spreadsheet, a webpage from a browser session, and a window opened through an application).

During operation, one or more of the source resources 310, 314 and 316 may be opened at the same time. Under direction of the user, the computing device 110 may copy content elements from the source resources 310, 314 and 316 (corresponding to content segments A, B, and C). In accordance with one embodiment, after one or more of the content segments A-C are copied to the clipboard 302, the computing device 110 may open/activate a new resource (e.g., active destination resource 312). When the destination resource 312 is activated, in accordance with embodiments herein, the processors identify a context associated with the destination resource 312. The processors match the context of the active destination resource with one or more resource context of interest from the RCA transfer library 318. For example, the destination resource 312 may have a login context associated with an individual bank account. The processors search the RCA transfer library 318 for a corresponding login context for an individual bank account. When the RCA transfer library 318 includes a login context of interest that corresponds to the login context for the individual bank account, the processors identify the transfer action associated with the login context of interest.

Based on the transfer action identified, the processors of the computing device 110 and/or remote device 160 automatically identify one of the content segments A-C from the clipboard 302 two be copied to the destination resource 312. For example, the processors review the designated transfer action to determine, among other things, a context of the source resource, one or more characteristics of the content segment (associated with the transfer action) and the like. Based thereon, the processors automatically identify one of the content segments A-C (304, 306 and 308) as an output resource advancement (RA) content segment. The outbound RA content segment is then transferred to the destination resource 312. In the example of FIG. 3, the content segment B 306 is identified as the outbound RA content segment to be transferred to the active destination resource 312.

In the foregoing manner, the clipboard 302 may receive content from different types of resources, such as an SMS application, notes application on the computing devices 110, a Word/Excel application, an e-mail application. For example, the clipboard 302 may receive a content segment A 304 from the SMS, a content segment B 306 from notes on the computing devices 110, a content segment C 308 from a Word/Excel document.

The content segments A-C 304, 306, 308 may be arranged on the clipboard 302 in an order in which the content segments were copied to the clipboard 302. In accordance with certain standard operations of the computing device, the content segments would be pasted from the clipboard 302 in the same order as copied to the clipboard 302, namely first in-first out. In accordance with embodiments herein, the content segments on the clipboard 302 are managed independently of the order in which the content segments are arranged on the clipboard. Accordingly, automated pasting operations implemented herein automatically pull in outbound RA content segment from the clipboard independent of the order in which the content segments are arranged on the clipboard 302.

The operations for transferring a content segment to a destination resource 312 are performed automatically based on resource context awareness. In connection therewith, the processors automatically copy the content segments to the clipboard 302 in the memory. The processors automatically identify a transfer action associated with a combination of the source resource to the active destination resource 312. In connection with the automatic transferring operation, the processors automatically pull the outbound RA content segment from the clipboard 302 independent of the order in which the content segments are arranged on the clipboard. For example, the outbound content segments may be copied and/or pasted from the clipboard 302 to the active destination resource 312 based on the order of the content segments stored on the clipboard 302.

The process described in connection with FIG. 3 assumes multiple content segments stored on the clipboard before, or at the time that, a destination resource is open/activated. Additionally or alternatively, embodiments herein may be implemented in which a destination resource is open/activated, and no related content segments are stored on the clipboard. A process is described hereafter in connection with FIG. 4 in which the clipboard does not necessarily already include a content segment that satisfies a transfer action corresponding to a present active destination resource. For example, during the process of FIG. 3, it may be determined that the clipboard does not contain any content segment that corresponds to the present active destination resource. Accordingly, flow may move from the process of FIG. 3 to the process of FIG. 4. Alternatively, the process of FIG. 3 may be omitted entirely, and the operations of FIG. 4 may be implemented independently as soon as a resource is open/activated.

FIG. 4 illustrates a process for the automatically transferring content segments from a source resource to a destination resource in accordance with an alternative embodiment. The operations of FIG. 4 are carried out by the processors 114, 164 in response to program instructions such as in the applications stored in the memories.

At 402, one or more processors 114, 164 access an active destination resource at a computing device. For example, the processors 114, 164 may determine that a resource has been opened, such as a webpage opened in a browser, an application opened on a portable computing device and the like. The processors 114, 164 identify a context for the resource to determine whether the resource represents a destination resource. When the context indicates that the resource represents a destination resource, the processors 114, 164 declare the resource to represent an active destination resource.

At 404, the one or more processors 114, 164 automatically compare the context of the active destination resource with one or more context of interest from the RCA transfer library 130, 180 to identify a matching resource context of interest. For example, the machine learning algorithms 121, 171 and/or the RCA manager 126, 176 may match the active destination resource with a context indicating a bank login page that utilizes two-factor authentication.

At 406, the one or more processors 114, 164 automatically identifying a transfer action associated with the context of the destination resource. For example, when the destination resource context indicates two-factor authentication for a bank login, the transfer action may indicate that a source resource corresponds to an SMS text messaging having a five digit alphanumeric code. As another example, when the destination resource context may indicate a credit card payment context, the transfer action may indicate that a source resource corresponds to a portion of a notes application to be opened on a mobile device and/or a portion of a Word document or Excel spreadsheet frequently opened/modified on a computing device.

At, 408, the one or more processors 114, 164 searches for and identifies an incoming source resource having a source context corresponding to the transfer action. In the foregoing bank login example, the processors search for SMS text messages that include an alphanumeric code with the corresponding number of digits. In the foregoing credit card payment example, the processors search for a source resource to be opened that represents a notes application, Word document or Excel spreadsheet.

The copied content segment is stored to a portion of the memory and is marked as an outbound content segment. Optionally, the content segment may be copied to a portion of the memory managed as a clipboard. Additionally or alternatively, the content segment may not be stored at any intermediate memory, but instead directly transferred by the operations at 410 and 412.

At 410, the one or more processors 114, 164 searches through the incoming source resource for a field that includes a content segment having a content characteristic that matches the content characteristic designated in the transfer action. In the foregoing bank login example, the processors search the SMS text message for the five digit alphanumeric code. In the foregoing credit card payment example, the processors search the notes application, Word document or Excel spreadsheet for credit card payment content segments, such as a credit card number, expiration date, security code, billing information, etc. the processors select and copy the content segments identified from the incoming source resource. The copied content segments are stored to the clipboard and/or other memory storage location and marked as an outbound RA content segment.

Optionally, a user confirmation may be requested. At 411, the one or more processors 114, 164 may provide a notification to a user when a content segment is copied from the incoming source resource to the clipboard and/or other memory storage location. For example, the notification may present a pop-up window, an audio notification, and/or other forms of notification. The notification that the content segment has been copied from the incoming source resource. Optionally, the processors may include information identifying the content segment in the notification. The identifying information may literally state the content segment, indicate the field or source, resource where the content segment was acquired and the like. The notification may also present a user input to reverse the automated copying operation, such as an "undo icon." For example, the user may be presented with a virtual icon and/or a yes/no option to permit or deny the automated copying operation of the content segment from the incoming source resource to the clipboard. Additionally or alternatively, one or more buttons, keystrokes, and/or other input means may be defined to permit the user to undo and/or reverse the automated copying operation. For example, the user may decline and/or undo the automated copying operation to the clipboard when the operation will inadvertently overwrite other content that the user has already stored on the clipboard. As another example, the user may be in the middle of another operation with multiple items being copied and pasted to and from the clipboard. It may be desirable to deny the automated copying operation to avoid reorganizing other content stored by the user on the clipboard.

Additionally or alternatively, the operation at 410 may not automatically be completed. Instead, once a content segment is identified automatically in the incoming source resource, the content segment may not automatically be transferred to the clipboard and/or other memory location. Instead, at 411, the processors present a pop-up, audio and/or other notification indicating that the system desires to complete the automated copying operation to the clipboard. The notification may present the user with the option to permit/approve the automated copying operation and/or decline the automated copying operation.

The options at 411 to 1) automatically paste to the clipboard or 2) first present the user with the option to approve or decline the automated copying operation, may be based on varying criteria. For example, when the processors determine that content was separately recently added to the clipboard, the processors may then ask the user permission to perform the automatic copying operation. For example, the user may have recently added content to the clipboard and still be in the middle of another data transfer operation and desire that no other content segment be copied to the clipboard. Accordingly, the processors may present the user with the option to approve/deny content to avoid interfering with the user's other data transfer operation.

At 411, the one or more processors 114, 164 receive a user confirmation input in connection with automatically transferring the content segment to the memory. For example, the user confirmation input may be associated with the "undo icon," keystrokes, permit/approve the automated copying operation, and/or the like. The user confirmation input may confirm and/or deny the content segment added to the memory and/or the clipboard.

When the user enters a confirmation input approving the content copy action, flow moves to 412. When the user enters a confirmation input denying or declining the content copy action, flow moves to 414.

At 414, the one or more processors remove the content segment from the clipboard or other portion of memory. At 412, the one or more processors 114, 164 transfer the outbound RA content segment from the memory to the corresponding field in the active destination resource.

Optionally, the one or more processors 114, 164 may update the RCA transfer library 130, 180 each time the operations of FIG. 4 are implemented. For example, the processors 114, 164 may adjust and/or update the RCA transfer library 130, 180 based on which source and destination resource context of interest are utilized, based on which content segments are utilized, based on how often certain resource context of interest are utilized and the like. For example, the processors 114, 164 may adjust the corresponding fields and/or the locations for the active destination resource 312. The adjustment may be based on adjustments from the user interface 120 of the computing devices 110. The processors 114, 164 may receive an adjustment from the user interface 120, such as a different corresponding field and/or the locations for the active destination resource 312. The processors 114, 164 may adjust the content segment responsive to the adjustment received from the user interface 120. For example, the processors 114 may update the RCA transfer library 130 based on the updated corresponding field and/or the locations from the user interface 120.

CLOSING STATEMENTS

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
   under control of one or more processors including program instructions to perform resource context awareness (RCA) by:
   displaying a source resource and an active destination resource contemporaneous with one another at a display of a computing device;
   automatically identifying a resource context associated with the active destination resource;
   automatically matching the resource context to a resource context of interest (COI) from an RCA transfer library; and
   transferring an outbound resource advancement (RA) content segment from a clipboard to the active destination resource based on the resource COI from the RCA transfer library, the outbound RA content segment copied from the active resource to the clipboard, and pasted from the clipboard to the active destination resource, contemporaneous with access to the source resource and active destination resource.

2. The method of claim 1, further comprising designating a content segment from a plurality of content segments stored in the clipboard of the computing device to be the outbound RA content segment based on the resource COI.

3. The method of claim 2, further comprising receiving a user confirmation input in connection with automatically transferring the outbound RA content segment from to an active destination resource.

4. The method of claim 1, further comprising identifying a transfer action from the RCA transfer library based on the resource COI, the transfer action including an operation to transfer a content segment from the source resource, the outbound RA content segment identified based on the transfer action.

5. The method of claim 4, further comprising utilizing a machine learning algorithm to build the transfer action, wherein the transfer action identifies source and destination contexts for the source and active destination resources.

6. The method of claim 1, wherein the RCA transfer library includes multiple transfer actions that comprise operations for selecting a source field from a source resource, copying content from the source field to the clipboard, selecting content from the clipboard, designating a destination field within a destination resource and copying the content from the clipboard to the destination field within the destination resource, the transferring based on one of the transfer actions corresponding to the resource COI.

7. The method of claim 1, further comprising:
   automatically identifying the transfer action associated with a combination of the source resource and the active destination resource, the transfer action designating the resource COI associated with the content segment to copy and paste from the source resource and to the active destination resource.

8. The method of claim 7, further comprising identifying an incoming content segment within the source resource; and copying the incoming content segment to the clipboard, wherein the transferring comprises automatically pasting the incoming content segment to the active destination resource as the outbound RA content segment.

9. The method of claim 1, wherein the clipboard comprises multiple content segments arranged on the clipboard in an order in which the content segments were stored to the clipboard, the transferring comprising automatically pulling the outbound RA content segment from the clipboard independent of the order in which the content segments are arranged on the clipboard.

10. The method of claim 1, further comprising populating the RCA transfer library by:
   tracking content segments copied from source resources to the clipboard;
   identifying source resources will COI from the source resources;

tracking destination resources to which the content segments are pasted;
identifying destination resources COI for the destination resources;
determining a correlation between the content segments, the source resources COI and the destination resources; and
building transfer actions based on the correlation and storing the transfer actions in the RCA transfer library.

11. A computing device, comprising:
one or more processors;
a display to display a source resource and an active destination resource contemporaneous with one another at the display;
memory to store program instructions accessible by the processor, the memory including a clipboard to store content segments;
wherein, responsive to execution of the program instructions, the one or more processors perform resource context awareness (RCA) by:
automatically identifying a resource context associated with the active destination resource opened on the computing device;
automatically matching the resource context to a resource context of interest (COI) from the RCA transfer library; and
transferring an outbound resource advancement (RA) content segment stored on the clipboard of the computing device to the active destination resource based on the resource COI from the RCA transfer library, the outbound RA content segment copied from the source resource to the clipboard, and pasted from the clipboard to the active destination resource, contemporaneous with access to the source resource and active destination resource.

12. The device of claim 11, wherein the memory to store an application, the to display a window associated with the application operating on the device, the window corresponding to the active destination resource, wherein the transferring comprises pasting the outbound RA content segment to a field in the window.

13. The device of claim 11, wherein the content segment represents a credential and the active destination resource represents a login webpage, the transferring comprising automatically pasting the credential to a credential entry field in the webpage.

14. The device of claim 11, wherein the resource COI represents one or more of a credentials context, multi-factor authentication context, travel context, account profile context, and financial payment context.

15. The device of claim 11, further comprising a machine learning algorithm (MLA) stored on the memory, the MLA updating the RCA transfer library, wherein the RCA transfer library is stored and maintained on a remote device, the memory storing the RCA transfer library.

16. The device of claim 11, further comprising identifying an incoming content segment within a source resource; and copying the incoming content segment to the clipboard based on a transfer action stored in the RCA transfer library, wherein the transferring comprises automatically pasting the incoming content segment to the active destination resource as the outbound RA content segment.

17. A computer program product comprising a non-signal computer readable storage medium comprising computer executable code to perform resource context awareness (RCA) by:
displaying a source resource and an active destination resource contemporaneous with one another at a display of a computing device;
automatically identifying a resource context associated with the active destination resource;
automatically matching the resource context to a resource context of interest (COI) from an RCA transfer library; and
transferring an outbound resource advancement (RA) content segment stored on a clipboard of the computing device to the active destination resource based on the resource COI from the RCA transfer library, the outbound RA content segment copied from the source resource to the clipboard, and pasted from the clipboard to the active destination resource, contemporaneous with access to the source resource and active destination resource.

18. The computer program product of claim 17, the executable code to:
access a source resource at the computing device; and
utilize a machine learning algorithm to automatically identify a transfer action associated with a combination of the source resource and the active destination resource, the transfer action designating the resource COI associated with content to copy and paste from the source resource and to the active destination resource.

19. The computer program product of claim 17, further comprising a clipboard to store multiple content segments arranged on the clipboard in an order in which the content segments were stored to the clipboard, the executable code to automatically pull the outbound RA content segment from the clipboard independent of the order in which the content segments are arranged on the clipboard.

20. The computer program product of claim 17, the executable code to populate the RCA transfer library by:
tracking content segments copied from source resources to the clipboard;
identifying source resources COI from the source resources;
tracking destination resources to which the content segments are pasted;
identifying destination resources COI for the destination resources;
determining a correlation between the content segments, the source resources COI and the destination resources; and
building transfer actions based on the correlation and storing the transfer actions in the RCA transfer library.

* * * * *